United States Patent
Ramabadran

(10) Patent No.: US 9,294,094 B1
(45) Date of Patent: Mar. 22, 2016

(54) METHOD AND APPARATUS FOR FAST LOW SKEW PHASE GENERATION FOR MULTIPLEXING SIGNALS ON A MULTI-FPGA PROTOTYPING SYSTEM

(71) Applicant: Cadence Design Systems, Inc., San Jose, CA (US)

(72) Inventor: Vasant V. Ramabadran, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/592,708

(22) Filed: Jan. 8, 2015

(51) Int. Cl.
*G06F 17/00* (2006.01)
*H03K 19/0175* (2006.01)
*G06F 17/50* (2006.01)

(52) U.S. Cl.
CPC .... *H03K 19/017581* (2013.01); *G06F 17/5054* (2013.01)

(58) Field of Classification Search
CPC .............. H03K 19/017581; G06F 17/5054
USPC ........................................... 716/116
See application file for complete search history.

(56) References Cited

U.S. PATENT DOCUMENTS

| | | | |
|---|---|---|---|
| 4,894,563 A * | 1/1990 | Gudger | H03K 19/17716 326/38 |
| 5,109,353 A | 4/1992 | Sample et al. | |
| 5,168,177 A * | 12/1992 | Shankar | G01R 31/318516 326/16 |
| 5,329,470 A | 7/1994 | Sample et al. | |
| 5,425,036 A | 6/1995 | Liu et al. | |
| 5,448,496 A | 9/1995 | Butts et al. | |
| 5,452,231 A | 9/1995 | Butts et al. | |
| 5,452,239 A | 9/1995 | Dai et al. | |
| 5,475,830 A | 12/1995 | Chen et al. | |
| 5,477,475 A | 12/1995 | Sample et al. | |
| 5,649,167 A | 7/1997 | Chen et al. | |
| 5,661,662 A | 8/1997 | Butts et al. | |
| 5,812,414 A | 9/1998 | Butts et al. | |
| 5,821,773 A | 10/1998 | Norman et al. | |
| 5,841,967 A | 11/1998 | Sample et al. | |
| 5,943,490 A | 8/1999 | Sample | |
| 5,960,191 A | 9/1999 | Sample et al. | |
| 5,963,735 A | 10/1999 | Sample et al. | |
| 6,020,760 A | 2/2000 | Sample et al. | |
| 6,058,492 A | 5/2000 | Sample et al. | |
| 6,127,865 A * | 10/2000 | Jefferson | G06F 1/10 327/149 |
| 6,377,911 B1 | 4/2002 | Sample et al. | |

(Continued)

*Primary Examiner* — Vuthe Siek
(74) *Attorney, Agent, or Firm* — Kaye Scholer LLP

(57) ABSTRACT

An apparatus and method is described for low skew phase generation for multiplexing signals using limited global low skew lines on a multiple FPGA system. The apparatus includes a reference clock programmed to generate a clock signal and programmable logic devices. The programmable logic devices include I/O terminals, combinational logic coupled to the I/O terminals, programmable logic coupled to the combinational logic, a phase generator programmed to receive the clock signal from the reference clock and to generate a phase clock based on the clock signal and a plurality of phase enable signals based on the phase clock, low skew lines to distribute the phase enables with minimal skew caused by routing delays, and flip-flops programmed to have a clock input driven by the phase clock, a data input coupled to ground, and a data output coupled to the combinational logic. Furthermore, synchronous preset inputs of the flip-flops receive the low skew phase enable signals to control transmission design signals by one of the I/O terminal.

20 Claims, 5 Drawing Sheets

(56) References Cited

U.S. PATENT DOCUMENTS

| | | |
|---|---|---|
| 6,377,912 B1 | 4/2002 | Sample et al. |
| 6,446,249 B1 | 9/2002 | Wang et al. |
| 6,625,793 B2 | 9/2003 | Sample et al. |
| 6,697,957 B1 | 2/2004 | Wang et al. |
| 6,832,185 B1 | 12/2004 | Musselman et al. |
| 6,842,729 B2 | 1/2005 | Sample et al. |
| 6,882,176 B1 | 4/2005 | Norman et al. |
| 7,260,794 B2 | 8/2007 | Butts |
| 7,379,861 B2 | 5/2008 | Kfir et al. |
| 7,739,097 B2 | 6/2010 | Sample et al. |
| 2011/0307233 A1* | 12/2011 | Tseng ............. G06F 17/5022 703/14 |

* cited by examiner

METHOD AND APPARATUS FOR FAST LOW SKEW PHASE GENERATION FOR MULTIPLEXING SIGNALS ON A MULTI-FPGA PROTOTYPING SYSTEM

FIELD

The present patent document relates generally to functional verification systems for circuit designs. In particular, the present patent document relates to a method and apparatus for low skew phase generation for multiplexing signals using limited global low skew lines on a multiple FPGA system.

BACKGROUND

Designers of integrated circuit devices ("chips"), generally application-specific integrated circuits ("ASICs"), use prototyping as part of the electronic design automation process prior to manufacture of the chip. Prototyping is one type of hardware-based functional verification that allows the circuit designer to observe the behavior of the circuit design under conditions approximating its final, manufactured performance. During prototyping, a circuit design, generally written in register transfer language ("RTL") code, is programmed into one or more programmable logic chips, frequently field-programmable gate arrays ("FPGA") on a prototyping board. FPGA-based prototypes are a fully functional representation of the circuit design, its circuit board, and its input/output ("I/O") devices. Also, FPGA prototypes generally run at speeds much closer to the clock speed at which the manufactured chip will run than other types of functional verification, e.g., software simulation, thereby allowing for verifying the circuit design under many more conditions in the same amount of time than other verification methods, and in particular, software simulation. The circuit design prototype may also be operated in another electronic circuit, e.g., the electronic circuit for which the design under verification will be used after fabrication, so that the circuit design prototype may be observed and tested in an environment in which the manufactured chip will be used. As such, circuit designers may use FPGA prototyping as a vehicle for software co-development and validation, increasing the speed and accuracy of system developments.

Prototyping of a circuit design using programmable logic chips (e.g., FPGAs) can have advantages over other types of functional verification, namely emulation using a plurality of emulation processors. First, prototyping using programmable logic chips generally results in higher speed relative to emulation using emulation processors. Second, such higher-speed circuit design prototypes using programmable logic chips can sometimes even run in real-time, that is, the prototype may run at the intended clock speed of the manufactured chip, rather than a reduced clock speed. This is not always the case, notably for higher performance circuit designs that have clock speeds higher than the maximum allowed by the programmable logic chips. Third, such prototyping systems using programmable logic chips are generally of lower cost than an emulation system using processors.

Recently, RTL designs used for prototyping have become very large and generally need to be mapped/partitioned to several large FPGAs on a prototyping system. Typically, these large designs employ many clocks (e.g., one to one hundred or more clocks) for the operation of the design. With multiple FPGAs, interconnects are required between the FPGAs for signal flow from one portion of the circuit design logic on a first FPGA to another portion of the circuit design logic on a second FPGA and so forth. However, current FPGAs have a limited number of input/output (I/O) pins and interconnects, which results in overall limited bandwidth for multiple FPGA prototyping systems.

In order to reduce the number of I/O signals across the FPGA partitions to the available bandwidth between FPGAs, prototyping systems typically use time domain multiplexing. For example, suppose the inter-FPGA connectivity between two FPGAs has a bandwidth of 100 (i.e., 100 physical wires), but the circuit design is partitioned across these FPGAs such that 1000 design signals are required to cross over the interconnect. In this scenario, a selector is required to select a group 100 of the 1000 signals to be transmitted at a single time and then repeated 10 times. To do so, a phase generator circuit is programmed that generates 1000/100 or 10 phases, such that each phase selects one of the groups of 100 signals to be transmitted from the first FPGA to the second FPGA at each phase.

FIG. 1 illustrates a conventional pin multiplexing design for multiplexing three design signals to one output pin of an FPGA. As shown, the conventional multiplexing design 100 includes three AND gates 110A, 110B and 110C with the output of each coupled to an inverted input of NAND gate 112. The output of the NAND gate 112 is coupled to an output terminal 114 of the FPGA, which is one I/O pin of the FPGA. Furthermore, each of the AND gates 110A, 110B and 110C has two inputs with the first input being coupled to a phase enable signal and the second input be coupled to a design signal. The design signals are data signals from the user logic of the FPGA that are to be multiplexed on the interconnect line connected to output terminal 114. In particular, $P_1$ corresponds to a first phase enable signal generated by a phase generator circuit, $P_2$ corresponds to a second phase enable signal generated by the phase generator circuit, and $P_3$ corresponds to a third phase enable signal generated by the phase generator circuit. Thus, phase enable signal $P_1$ enables output terminal 114 to transmit design signal $I_1$ over the attached interconnect, phase enable signal $P_2$ enables output terminal 114 to transmit design signal $I_2$ over the attached interconnect, and phase enable signal $P_3$ enables output terminal 114 to transmit design signal $I_3$ over the attached interconnect.

The FPGA pin multiplexing shown in FIG. 1 has numerous problems and limitations. In particular, the phase control lines of the pin-multiplexing logic that drive the I/O lines need to have very low skew (i.e., clock signal delay) in order to guarantee logical correctness of operations and to achieve high performance. However, the I/O pins of current FPGAs are spread far apart such that driving two or more I/O locations with the same driver (i.e., the phase enable output) mapped to local routing resources in each FPGA will lead to high skew. Moreover, the skew of the phase enable outputs will only increase depending on the number of fanout loads on each phase enable output. In addition, the FPGA fabric has a limited set of available low skew global clock lines and most modern FPGA place and route tools do not allow these global clock lines to be programmed to drive combinational logic (i.e., non clock loads) that are usually required for pin multiplexing, such as the AND gates shown in FIG. 1. And even if the FPGAs enable global low skew clock lines to be used to drive combinational logic, there are a very limited number of these lines on current FPGAs and the circuit design will quickly run out of them when used for pin multiplexing.

SUMMARY

The present patent document relates to a method and apparatus for low skew phase generation for multiplexing signals using limited global low skew lines on a multiple FPGA system.

According to an exemplary embodiment, an apparatus is provided for multiplexing signals of programmable logic devices in a prototyping system. The apparatus includes a reference clock programmed to generate a clock signal and at least one programmable logic device. The programmable logic device includes a plurality of input and output (I/O) terminals; combinational logic coupled to at least one of the plurality of I/O terminals; a phase generator programmed to receive the clock signal from the reference clock and to generate a phase clock based on the clock signal and a plurality of phase enable signals based on the phase clock; and at least one flip-flop programmed to have a clock input driven by the phase clock, a data input coupled to ground, and a data output coupled to the combinational logic; wherein a synchronous preset input of the at least one flip-flop receives one of the plurality of phase enable signals to control transmission by the at least one I/O terminal of at least one design signal received by the combinational logic.

According to one embodiment, at least one programmable logic device is a field-programmable gate array.

According to one embodiment, at least one programmable logic device further comprises programmable logic coupled to the combinational logic, the programmable logic corresponding to a partial logic design and generating the at least one design signal during an operation cycle of the prototyping system.

According to one embodiment, the combinational logic of the at least one programmable logic device comprises at least one AND gate having a first input coupled to the programmable logic to receive the at least one design signal and a second input coupled to the data output of the at least one state-element like a flip-flop or a memory According to one embodiment, the combinational logic of the at least one programmable logic device further comprises at least one NAND gate having an inverted input (collectively an OR gate) coupled to an output of the AND gate and an output coupled to the at least one I/O terminal.

According to one embodiment, the phase generator further comprises a plurality of phase output pins and an internal counter that drives the plurality of phase enable signals on each of the plurality of phase output pins, respectively, based on the phase clock.

According to one embodiment, the at least one programmable logic device further comprises at least one low skew clock line that is programmed to couple at least one of the plurality of phase enable signals to the synchronous preset input of the at least one flip-flop.

According to another embodiment, a computer-implemented method is provided for multiplexing signals of programmable logic devices in a prototyping system. The method includes programming a reference clock on a prototyping board of the prototyping system to generate a clock signal; programming combinational logic on at least one programmable logic device to be coupled to at least one of a plurality of I/O terminals of the at least one programmable logic device; programming a phase generator in at least one of the programmable logic devices to receive the clock signal from the reference clock; programming a phase generator in the at least one programmable logic device to generate a phase clock based on the clock signal and a plurality of phase enable signals based on the phase clock; connecting at least one flip-flop in the at least one programmable logic device to have a clock input driven by the phase clock, a data input coupled to ground, and a data output coupled to the combinational logic; and programming a synchronous preset input of the at least one flip-flop to receive one of the plurality of phase enable signals to control transmission by the at least one I/O terminal of at least one design signal received by the combinational logic.

According to one embodiment, the method includes programming programmable logic of the at least one programmable logic device to correspond to a partial logic design and to generate the at least one design signal that is input to the combinational logic during an operation cycle of the prototyping system.

According to one embodiment, the method includes programming the combinational logic of the at least one programmable logic device to include at least one AND gate having a first input coupled to the programmable logic to receive the at least one design signal and a second input coupled to the data output of the at least one flip-flop or a state element.

According to one embodiment, the method includes programming the combinational logic of the at least one programmable logic device to further include at least one NAND gate having an inverted input (collectively an OR gate) coupled to an output of the AND gate and an output coupled to the at least one I/O terminal.

According to one embodiment, the method includes programming the phase generator to include a plurality of phase output pins and an internal counter that drives the plurality of phase enable signals on each of the plurality of phase output pins, respectively, based on the phase clock.

According to one embodiment, the method includes sorting the plurality of phase enable signals generated by the at least one programmable logic device according to a number of loads driven by each of the plurality of phase enable signals; determining whether a low skew clock line of the at least one programmable logic device is available for the multiplexing; and if a low skew clock line is available, programming the available low skew clock line to be connected between the synchronous preset input of the at least one flip-flop and a previous phase of the plurality of phase enable signals.

According to another one embodiment, a computer-readable non-transitory storage medium is provided having stored thereon a plurality of instructions, the plurality of instructions when executed by a computer, cause the computer to program a reference clock on a prototyping board of the prototyping system to generate a clock signal; program combinational logic on at least one programmable logic device to be coupled to at least one of a plurality of I/O terminals of the at least one programmable logic device; program a phase generator in at least one of the programmable logic devices to receive the clock signal from the reference clock; program a phase generator in the at least one programmable logic device to generate a phase clock based on the clock signal and a plurality of phase enable signals based on the phase clock; connect at least one flip-flop in the at least one programmable logic device to have a clock input driven by the phase clock, a data input coupled to ground, and a data output coupled to the combinational logic; and program a synchronous preset input of the at least one flip-flop to receive one of the plurality of phase enable signals to control transmission by the at least one I/O terminal of at least one design signal received by the combinational logic.

According to one embodiment, the method includes the plurality of instructions when executed by a computer further cause the computer to program programmable logic of the at least one programmable logic device to correspond to a partial logic design and to generate the at least one design signal that is input to the combinational logic during an operation cycle of the prototyping system.

According to one embodiment, the method includes the plurality of instructions when executed by a computer further cause the computer to program the combinational logic of the at least one programmable logic device to include at least one AND gate having a first input coupled to the programmable logic to receive the at least one design signal and a second input coupled to the data output of the at least one flip-flop.

According to one embodiment, the method includes the plurality of instructions when executed by a computer further cause the computer to program the combinational logic of the at least one programmable logic device to further include at least one NAND gate having an inverted input (collectively an OR gate) oupled to an output of the AND gate and an output coupled to the at least one I/O terminal.

According to one embodiment, the method includes the plurality of instructions when executed by a computer further cause the computer to program the phase generator to include a plurality of phase output pins and an internal counter that drives the plurality of phase enable signals on each of the plurality of phase output pins, respectively, based on the phase clock.

According to one embodiment, the method includes the plurality of instructions when executed by a computer further cause the computer to sort the plurality of phase enable signals generated by the at least one programmable logic device according to a number of loads driven by each of the plurality of phase enable signals; determine whether a low skew clock line of the at least one programmable logic device is available for the multiplexing; and if a low skew clock line is available, program the available low skew clock line to be connected between the synchronous preset input of the at least one flip-flop and a previous phase of the plurality of phase enable signals.

According to one embodiment, each of the plurality of programmable logic devices is a field-programmable gate array.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
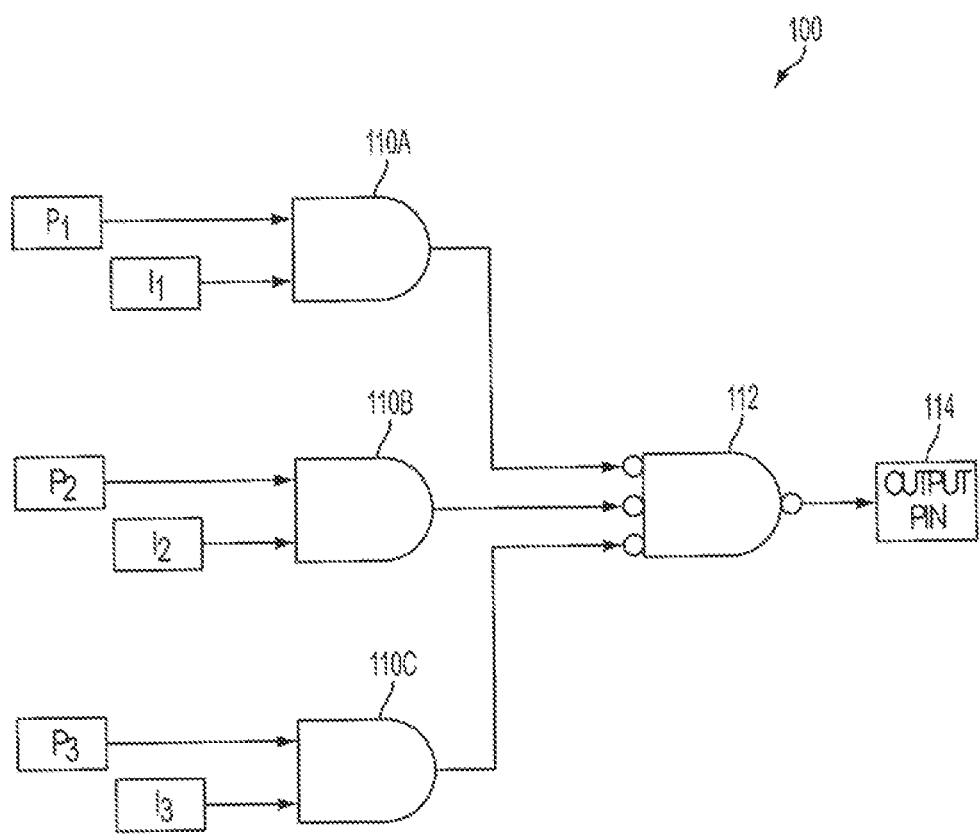
FIG. 1 illustrates a conventional pin multiplexing design for multiplexing three design signals to one output pin of an FPGA.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

Each of the features and teachings disclosed herein can be utilized separately or in conjunction with other features and teachings. Representative examples utilizing many of those additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present invention. However, it will be apparent to one skilled in the art that these specific details are not required to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present patent document also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 2:
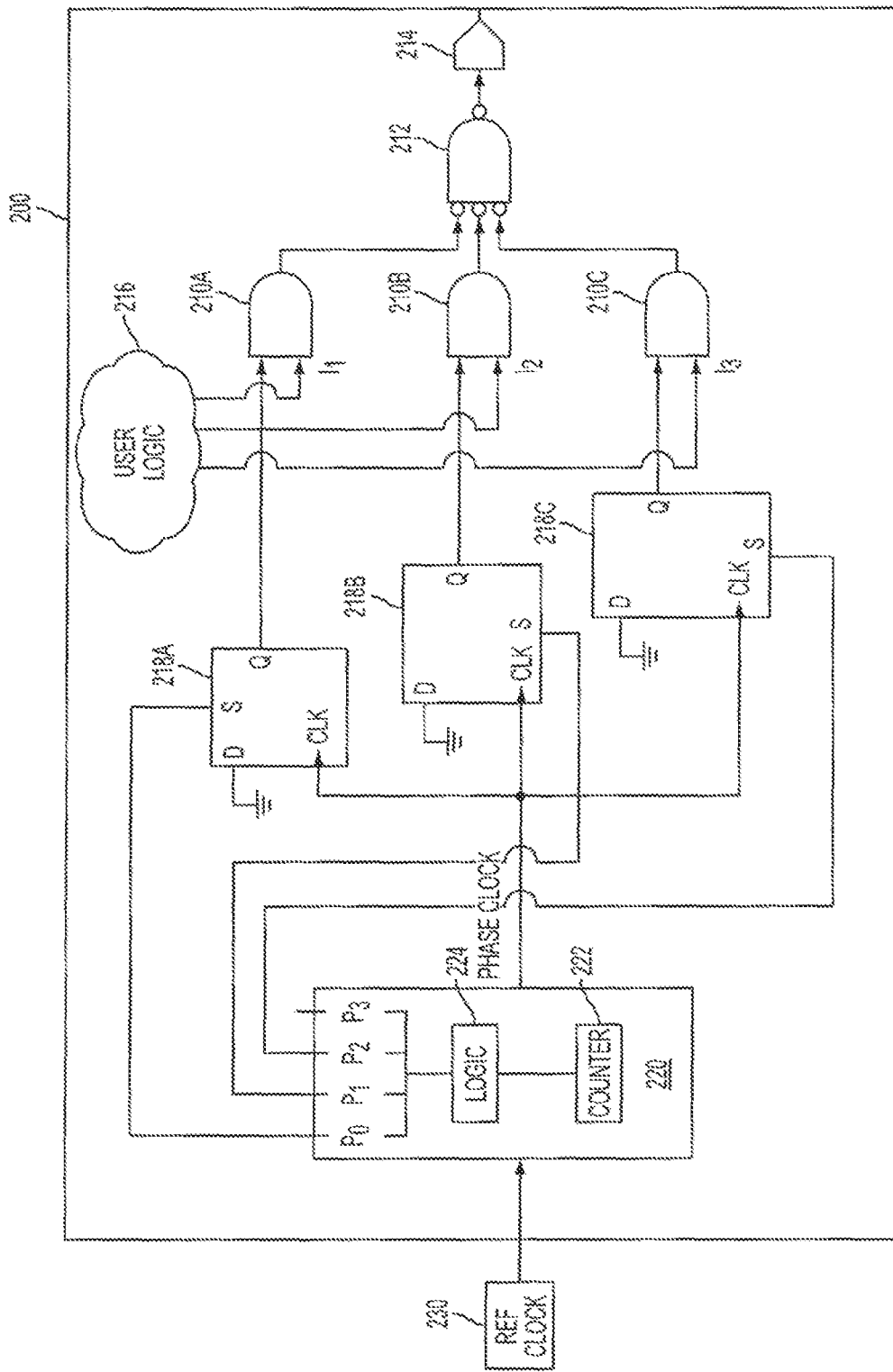
FIG. 2 illustrates a circuit for multiplexing signals on input/output pins of an FPGA using limited global low skew lines on a multiple FPGA system according to an exemplary embodiment

FIG. 2 illustrates an embodiment of a circuit that multiplex signals on input/output pins of an FPGA using limited global low skew lines present in multiple FPGA system according to an exemplary embodiment. Specifically, FIG. 2 illustrates a pin multiplexing circuitry programmed into one FPGA 200 of a plurality of FPGAs disposed on a circuit board of a prototyping system. Although only one FPGA 200 is shown in FIG. 2, it should be understood that the disclosure herein is for use in a multiple FPGA system. Thus, FPGA 200 is a part of an exemplary prototyping system comprising at least one circuit board, and in which each circuit board hosts multiple FPGAs, one or more on-board reference clocks and clock generation circuits, interconnect lines connecting the FPGAs to each other, I/O devices for communication to external hardware, connectors, and memory. These additional components are known to those skilled in the art and have not been shown so as to not unnecessarily obscure the aspects of the disclosure. It should also be appreciated that the programmable logic devices used in this embodiment are FPGAs. However, as will be appreciated by one of skill in the art, any number of programmable logic devices suitable for prototyping may be used in place of the FPGAs of the exemplary embodiment. Moreover, partitioning of the circuit design can be accomplished using any number of partitioning techniques well known to those in the field of prototyping.

In a prototyping system as described herein, FPGAs communicate with each other and with external circuitry by sending signals from input/output (I/O) terminals of the FPGA and/or by receiving signals via I/O terminals of the FPGA. Accordingly, each signal passing onto or from the FPGA integrated circuit passes through an I/O terminal of the package. As shown in FIG. 2, FPGA 200 includes an output terminal 214 for transmitting signals to other FPGAs and/or external circuitry in the exemplary prototyping system. It is noted that while the exemplary design illustrates multiplexing of output signals on one output terminal 214 (i.e., a single I/O bank) as will be described in detail below, it should be appreciated that this design can be implemented for each output terminal (e.g., 100 output terminals of an FPGA) of an FPGA in the multiple FPGA system. Moreover, it should be understood that the design described herein can be implemented on input terminals of the FPGA. In such an implementation, a corresponding de-multiplexing circuit is instantiated, which includes a flip-flop(s) with a data input that connected to the input terminal. Furthermore, similar to the design shown in FIG. 2, the flip-flop(s) includes a clock input that is connected to the phase clock and an enable pin that is connected to the appropriate phase from the phase generator. It should be appreciated that the phase for this embodiment is not the same phase as the output phase but rather delayed to account for signal transmission delay from one FPGA's output to the other FPGA's input.

As shown in FIG. 2, the combinational logic of the pin multiplexing circuitry programmed into FPGA 200 contains logic that is similar to that shown in FIG. 1 and described above. Namely, FPGA 200 includes three AND gates 210A, 210B and 210C with the output of each coupled to inverted inputs of NAND gate 212. It should be appreciated that the NAND gate 212 and inverted inputs collectively function equivalent to an OR gate. Further, the output of the NAND gate 212 is coupled to the output terminal 214 of the FPGA, which is one I/O pin of the FPGA, as described above. It should be appreciated that the combinational logic shown in FIG. 2 is an exemplary design for the pin multiplexing circuitry, but that alternative logic combinations and gates can be implemented as would be understood to one skilled in the art.

In addition, the second of each respective input of the three AND gates 210A, 210B and 210C receives design signals $I_1$, $I_2$ and $I_3$. The design signals $I_1$, $I_2$ and $I_3$ are signals received from user logic 216 that was programmed into logic resources of FPGA 200, which is the circuit design being prototyped and verified. As should be appreciated to one skilled in the art, user logic 216 is the user's logic design that has been programmed into the programmable logic of the FPGA and corresponds to a portion, i.e., a partition, of the actual circuit design being evaluated. Thus, user logic 216 outputs design signals $I_1$, $I_2$ and $I_3$ during circuit operation (e.g., when the system containing FPGA 200 is running the user's design) that are then output to another FPGA or the like from FPGA 200 via output terminal 214. Although not shown, it is contemplated that user logic 216 would also be communicatively coupled to input terminals of FPGA 200. Furthermore, while only three design signals $I_1$, $I_2$ and $I_3$ are being multiplexed according to the exemplary embodiment, this number of design signals is provided only for illustrative purposes and will vary based on the total number of signals that need to be transmitted during one operation cycle of the circuit design as well as the total number of I/O pins for the given FPGA.

As further shown, the first input of each of the three AND gates 210A, 210B and 210C is coupled to a synchronous phase delay sequential element, i.e., flips-flops 218A, 218B and 218C. In general, FPGAs include a plurality of programmable logic blocks, selection circuitry (e.g., multiplexers and the like), and flip-flops, with each flip-flop including a data input D, a synchronous preset or set pin S, a clock input CLK and a data output Q. According to the exemplary embodiment, flip-flops on the FPGA are programmed to be used for the pin multiplexing circuitry with the data inputs D coupled to ground and the data outputs Q coupled to the first input of its respective AND gates (i.e., AND gates 210A, 210B and 210C of FIG. 2).

Furthermore, a time domain multiplexing ("TDM") phase generator 220 is programmed in FPGA 200 to control the specific time domain multiplexing of the design signals $I_1$, $I_2$ and $I_3$ on the output terminal 214. A central reference clock 230 is provided on the prototyping board that generates reference clock signals that are transmitted to the TDM phase generator 220 of the FPGA 200. In the exemplary embodiment, the central reference clock 230 can be on the prototyping board or elsewhere, but is not either fabricated or programmed into FPGA 200 in which the partition of the user's design is programmed. Based on the signals from the central reference clock 230, the TDM phase generator 220 generates a high-speed clock (i.e., a phase clock) that separates the phases for time domain multiplexing of the signals output by the output terminal 214 and other output terminals (not shown) of the FPGA 200. The phase clock generated by TDM phase generator 220 is output to the clock input CLK of each flip-flop 218A, 218B and 218C. It is contemplated that the phase clock serves as a timing unit for the circuit designer where each unit can be considered a "step" for controlling the multiplexing of the output terminals, as will be described in detail below.

At the rising edge of each step of the phase clock, each flip-flop reads in a data signal input to data input D and outputs the data signal from output Q of the flip-flop (subject to the synchronous preset pin S) to the connected AND gate of the pin multiplexing circuitry programmed into FPGA 200. In this design, because the data input D of each flip-flop is coupled to ground, the output Q of each flip-flop will normally be a low logic signal "0" at the rising edge of each step of the phase clock. In turn, the output of the connected AND gate will also be a low logic signal "0" regardless of whether the second input that receives the design signal is either a "0" or a "1".

According to the exemplary embodiment, TDM phase generator 220 can be programmed to include a plurality of phase enable outputs in addition to the generated phase clock discussed above. The terms phase output, phase enable, and phase enable output, are used interchangeably in this disclosure. As shown in the embodiment illustrated in FIG. 2, TDM phase generator 220 has been programmed to include four phase outputs $P_0$, $P_1$, $P_2$ and $P_3$ and that these outputs have relative offsets of 0°, 90°, 180° and 270°. Moreover, TDM phase generator 220 includes a programmable counter 222 that increases from a binary 0 to a binary 3 in response to each step or unit from the phase clock. In other words, at each step received from the phase clock, the counter increments by 1. The counter 222 is in turn coupled to phase output logic circuitry 224 that drives the TOM phase generator 220 to cycle through each of the four phase outputs and generate a high logic signal from the respective phase output. In other words, when counter 222 output a binary 0 (i.e., 00), phase output logic circuitry 224 drives phase output $P_0$ to output a high logic signal "1", when counter 222 outputs binary 1 (i.e., 01), phase output logic circuitry 224 drives phase output $P_1$ to output a high logic signal "1", and so forth. Once the operation cycle is complete, the next cycle begins again by outputting a high logic signal "1" from phase output $P_0$. It is noted that while four phase outputs are shown and counter 222 is programmed as a 4-bit counter in FIG. 2, this is an exemplary design according to the described embodiment. In alternative embodiments, TDM phase generator 220 can be programmed to have smaller or larger counters and less or more phase outputs. Moreover, the specific details of phase output logic circuitry 224 will not be described in detail, but it should be understood that this logic can include multiplexers, de-multiplexers, and the like, which can drive each of the phase outputs in response to the output of the incremental counter 222 as would be understood to one skilled in the art.

According to the exemplary embodiment, the phase outputs of the TDM phase generator are coupled to the synchronous preset input pins S of flip-flops of the FPGA 200. Moreover, as discussed in detail below with respect to FIG. 5, the phase enable output signals are transmitted to the synchronous preset input pins of the flip-flops over available low skew clock lines. In this regard, the phase output signals can be used to control the multiplexing, i.e., the timing of transmission of design signals $I_1$, $I_2$ and $I_3$ by output terminal 214. More particularly, for each design signal i, the i–1 phase enable output generated by the TDM phase generator 220 is coupled to the respective synchronous preset input pin S of the flip-flop. For example, for design signals $I_1$ coupled to AND gate 210A as shown in FIG. 2, the phase output signal $P_{i-1}$, phase output signal or phase output $P_0$ is coupled to the synchronous preset input pins S of the flip-flop 218A that is also coupled to AND gate 210A. Likewise, for design signals $I_2$ coupled to AND gate 210B, the phase output signal $P_1$ is coupled to the synchronous preset input pins S of the flip-flop 218B that is also coupled to AND gate 210B. This programming process is repeated for the $I_{th}$ design signals and Ii–1 phase enable output signals.

Accordingly, when the TDM phase generator 220 generates a high logic signal "1" on a given phase output (e.g., phase output $P_0$), the high logic signal "1" is input to the synchronous preset pin S of the connected flip-flop (e.g., flip-flop 218A), which then drives the data output Q of the flip-flop 218A to a high logic signal "1" at the next rising edge of the phase clock, which is input to clock input CLK of flip-flop 218A. In response to the high logic signal "1" from the flip-flop, the connected AND gate (e.g., AND gate 210A) outputs a signal that corresponds to the design signal coupled to that AND gate (e.g., design signal $I_1$). In other words, if design signals $I_1$ is a low logic signal "0", the AND gate 210A will output a "0", and if design signals $I_1$ is a high logic signal "1", the AND gate 210A will output a "1". Following through the combinational logic, the output terminal 214 will also output the same signal as the design signal $I_1$. It should be appreciated that the time domain multiplexing is performed for each phase output down the chain of the I/O bank of the FPGA 200. Thus, at phase output $P_0$, the output terminal 214 outputs design signals $I_1$, at phase output $P_1$, the output terminal 214 outputs design signals $I_2$, at phase output $P_2$, the output terminal 214 outputs design signals $I_3$, and so forth.

Figure 3:
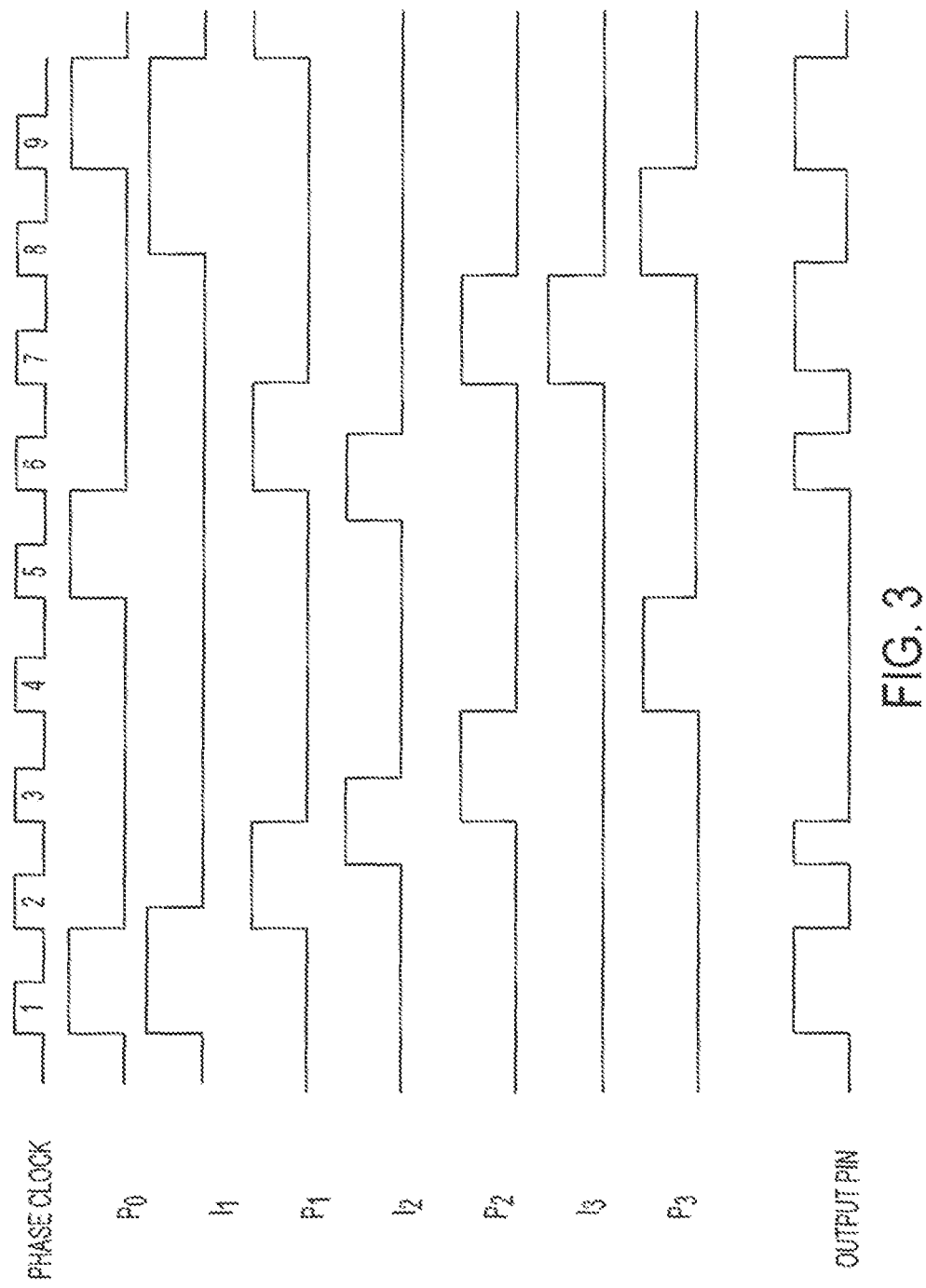
FIG. 3 illustrates a timing diagram of the clock and data signals transmitted according to the exemplary circuit design in FIG. 2.

FIG. 3 illustrates a timing diagram of the clock and data signals transmitted according to the exemplary circuit design in FIG. 3. As a preliminary matter, it is noted that the design signals $I_1$, $I_2$ and $I_3$ output from user logic 216, as shown in FIG. 2, are exemplary data signals for purposes of the timing diagram. As described above, these data signals will be generated by user logic 216 of the FPGA or the like and can be any number and sequence of signals. As shown in FIG. 3, TDM phase generator 220 generates a continuous and periodic phase clock that drives the counter and also drives the timing of the output of the flip-flops 218A, 218B and 218C. First, the phase clock of the TDM phase generator 220 incrementally increases the programmable counter 222 from a binary 0 to a binary 3 in response to each step or unit from the phase clock. As a result, phase output $P_0$ outputs a high logic signal at the first step of the phase clock, i.e., when the programmable counter 222 generates a binary output of 00.

Moreover, phase output $P_1$ outputs a high logic signal at the second step of the phase clock, i.e., when the programmable counter 222 generates a binary output of 01. Phase output $P_2$ outputs a high logic signal at the third step of the phase clock, i.e., when the programmable counter 222 generates a binary output of 10. Phase output $P_3$ outputs a high logic signal at the fourth step of the phase clock, i.e., when the programmable counter 222 generates a binary output of 11.

Because the phase output $P_0$ is coupled to the present input pin S of flip-flop 218A, the positive (rising) edge of the phase clock $P_0$ forces the output Q of flip-flop 218A to a high logic signal "1". Furthermore, once the design signal $I_1$ also generates a high logic signal "1", the output of AND gate 210A will be a "1", which in turn forces the output of NAND gate 214 to a "1", such that output terminal 214 transmits a "1" on the interconnect wire connected to FPGA 200.

As further shown in the timing diagram of FIG. 3, the multiplexing control is continued for each of design signal $I_2$ and design signal $I_3$. Again, it should be appreciated that the design signal transmitted by output terminal 214 will be determined when the particular phase output is high during a given step of a phase clock and based on whether the design signal is a "1" or a "0".

In view of the exemplary circuit design of FIG. 2 and timing diagram of FIG. 3, it should be appreciated that the apparatus and method disclosed herein accurately and efficiently control the time domain multiplexing of signals transmitted by each FPGA of a multiple FPGA prototyping system. This is accomplished by programming the data inputs D of synchronous phase delay sequential element, i.e., flipsflops 218A, 218B and 218C, to be coupled to the phase outputs generated by TDM phase generator 220 on low skew clock lines, and to couple the outputs Q to the respective AND gates 210A, 210B, and 210C.

Figure 4:
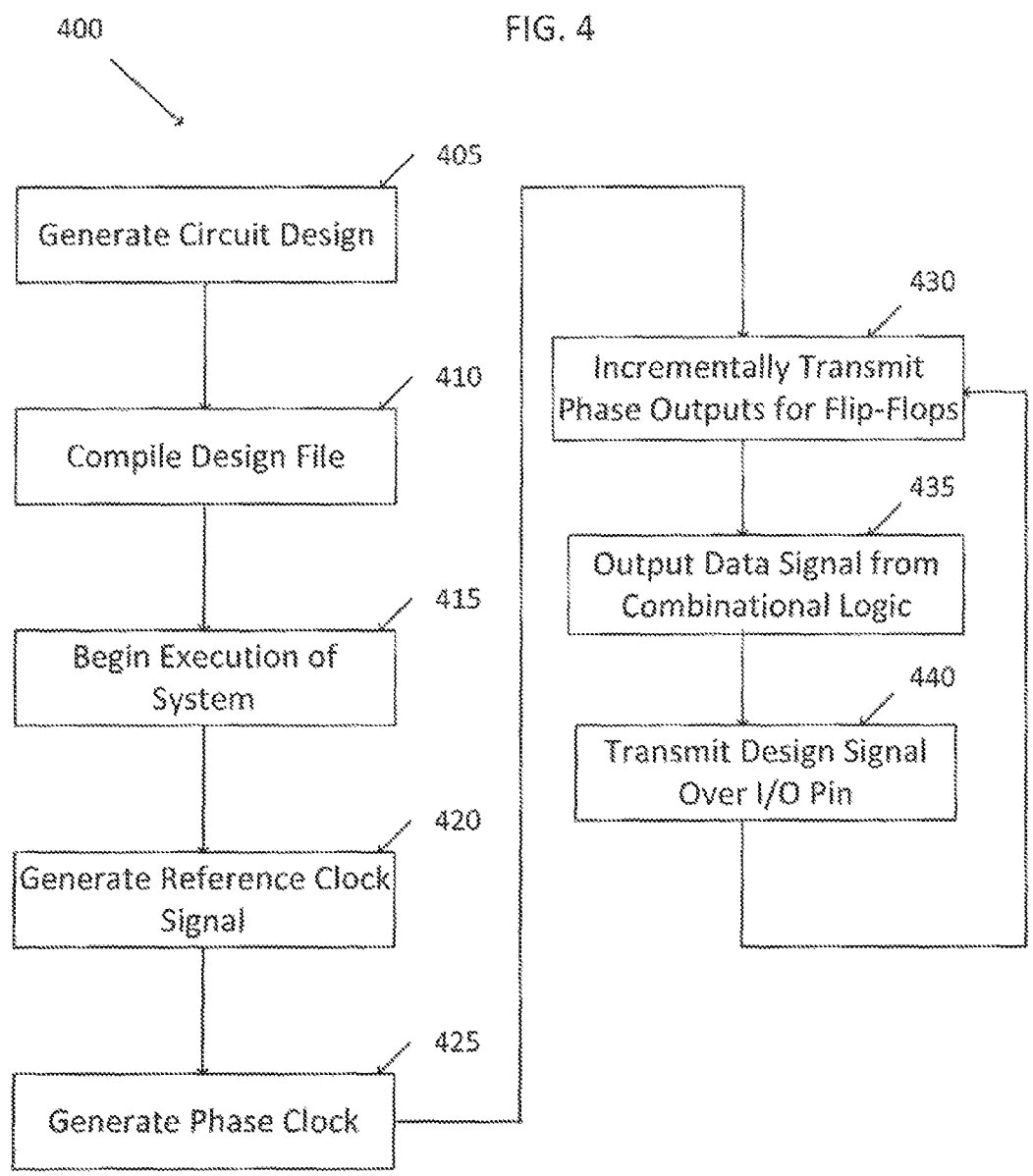
FIG. 4 illustrates a flow diagram of a method 400 for low skew phase generation for multiplexing signals using limited global low skew lines on a multiple FPGA system according to an exemplary embodiment.

FIG. 4 illustrates a flow diagram of a method 400 for low skew phase generation for multiplexing signals using limited global low skew lines on a multiple FPGA system according to an exemplary embodiment. Initially, at step 405, a designer generates a circuit design for prototyping into an output file. A wide variety of electronic design automation ("EDA") tools can be used to generate and compile the circuit design. Once the circuit is designed, the user issues a compile command at step 410 to compile the user's device design into the prototype circuit design, which includes partitioning the user's design onto FPGAs of the prototyping system and programming the FPGAs to include the TDM phase generator, flip-flops and the combinational logic. The exemplary process tor programming of the pin multiplexing circuitry disclosed herein will be described in detail below with respect to FIG. 5. However, according to the exemplary embodiment, it should generally be understood that step 410 includes placing phase enable outputs on low skew clock lines of each FPGA used for the circuit design and coupling these outputs to synchronous preset input pins S of synchronous phase delay sequential elements, whose data outputs Q are respective coupled to combinational logic that is coupled to I/O outputs of each FPGA.

Next, at step 415, the circuit designer begins execution of the system in which the circuit design prototype is operating for the design evaluation and debugging process of the prototype circuit design. This can be done by stimulating the design with test vectors that mimic actual operation, or by using the prototyping system with actual hardware that the design will be used in after it is verified and fabricated into an integrated circuit. Execution of the design will proceed through the remaining steps, labeled as steps 420 through 440 in FIG. 4. Thus, during execution, a reference clock on the prototyping board (e.g., reference clock 230 of FIG. 2) transmits a reference clock signal to each TDM phase generator on each FPGA, preferably over low-skew lines on the prototyping board (step 420). At step 425, the TDM phase generator (e.g., TDM phase generator 220 of FIG. 2) receives the reference clock signal and generates a phase clock (i.e., local to that FPGA). Furthermore, the TDM phase generator concurrently increments an internal binary counter based on the phase clock that controls the phase outputs (e.g., phase outputs $P_0$, $P_1$, $P_2$ and $P_3$) of the TDM phase generator. In particular, at step 430, the first phase output $P_0$ is generated by the TDM phase generator and transmitted to the synchronous preset input pin S of the first flip-flop (e.g., flip-flop 218A of FIG. 2), which, in response, generates a high logic signal "1". Next, at step 435, the connected AND gate (e.g., AND gate 210A of FIG. 2) outputs a data signal that corresponds to design signal $I_1$. At step 440, the connected terminal output (e.g., terminal output 214 of FIG. 2) transmits the design signal $I_1$ on the interconnect to the respective target, for example, the next FPGA in the circuit design. Steps 430 through 440 are repeated for each phase output $P_1$, $P_2$ and $P_3$ and respective design signal $I_2$, $I_3$ and $I_4$. Although not shown in FIG. 4, it should be appreciated that in response to the operation of the partial logic designs on each FPGA, waveform capture can be performed of the design for debugging and evaluation according known techniques in the art.

Figure 5:
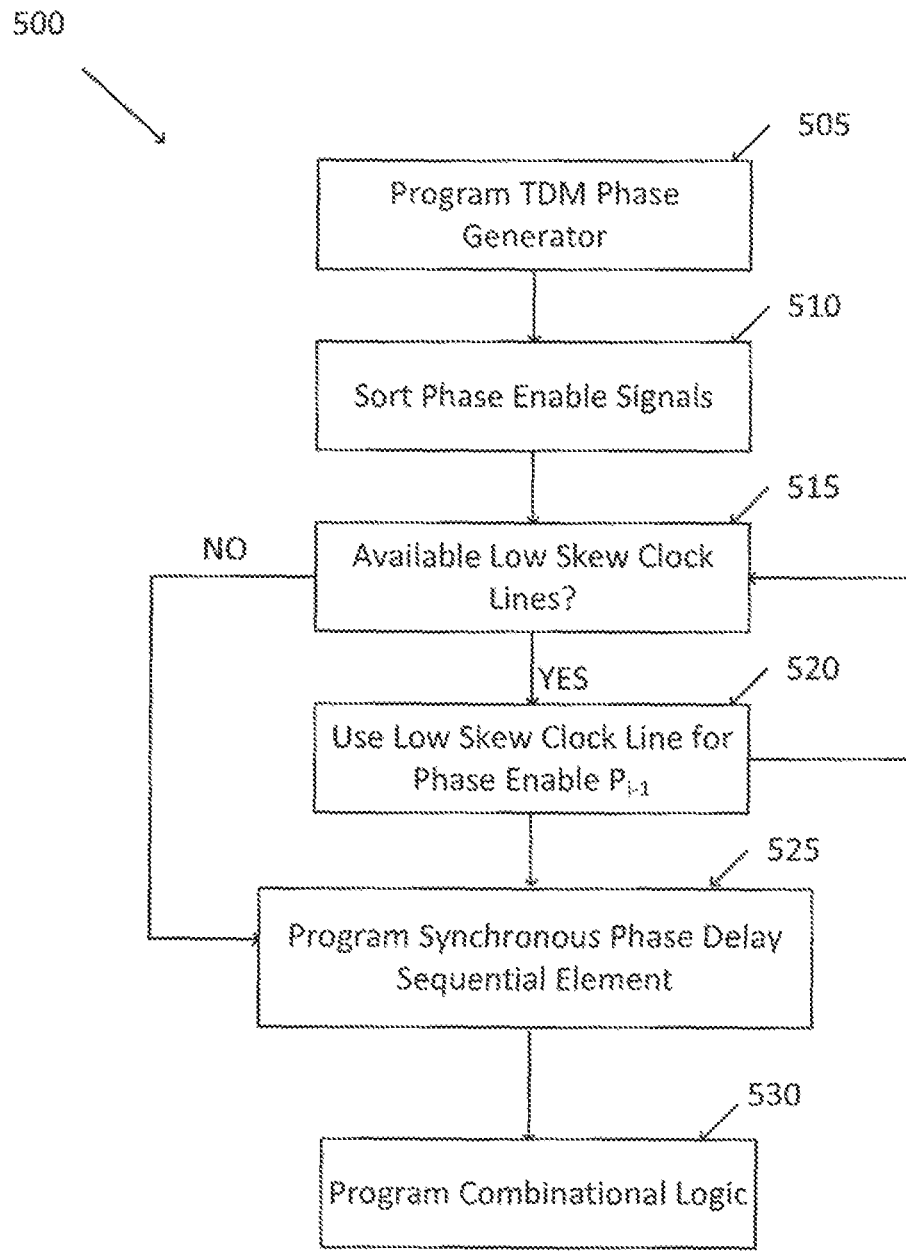
FIG. 5 illustrates a software flow chart for a method 500 for generating circuitry that multiplexes signals on input/output pins to be programmed into FPGAs according to an exemplary embodiment.

FIG. 5 illustrates a software flow chart for a method 500 for processing a user's logic design so that it can be programmed into FPGAs to include the pin multiplexing circuitry according to an exemplary embodiment. As described above, the method shown in FIG. 5 takes place during step 410 of the of FIG. 4. Moreover, the prototyping software is run on a workstation, comprising a general-purpose processor, RAM, harddisk or other permanent storage, and input/output devices in electrical communication with a prototyping board comprising FPGAs or other programmable logic chips, input/output circuitry, and interconnect circuitry connecting the programmable logic chips to each other and to the input-output circuitry. In addition, the design file for the circuit design can be in any format suitable for partitioning and programming into programmable logic chips of a prototyping system, for example hardware description language ("HDL") format.

It should be appreciated that the flow chart illustrated in FIG. 5 discloses the programming process of one FPGA of the prototyping system to include the pin multiplexing circuitry disclosed herein. It is contemplated that in the exemplary embodiment this process is repeated for some or all of the FPGAs partitioned for the user's device design in the prototyping system. The process can also be performed concurrently for each FPGA. As shown, initially at step 505, the FPGA is programmed to include the TDM phase generator (e.g., TDM phase generator 220 of FIG. 2). This programming step includes coupling the TDM phase generator to the reference clock of the prototyping circuit board and programming the TDM phase generator to have a specified number of phase outputs. In addition, the TDM phase generator is programmed to generate a phase clock and include a counter and logic that controls the timing of the phase outputs. In the exemplary embodiment of FIG. 2, the TDM phase generator is programmed to generate four phase outputs $P_0$, $P_1$, $P_2$ and $P_3$. However, it should be understood that the number of phase outputs would be based on the number of I/O terminals and signals that need to be transmitted over one operation cycle. For example, if 1000 signals need to be transmitted over one operation cycle and there are 100 I/O terminals, then the phase generator would be programmed to generate 1000/100 or 10 phases.

Next, at step 510, the phase enable signals are sorted by the number of loads (i.e., design signals to be driven) on each phase enable output in descending order. In other words, the phase output $P_0$ will have the most loads, followed by phase output $P_1$, followed by phase output $P_2$ and so forth. At step 515, the compiler then determines if low skew clock lines are available and designates the available lines for the phase output signals. In particular, for each phase enable $P_i$ (where the subscript i denotes the ith phase) in the list P, if a low skew clock line is available at step 520, it is programmed to serve as the line for the previous phase enable signal $P_{i-1}$. Thus, $P_0$ is first designated for an available low skew clock line, then $P_1$ is designated for the next available low skew clock line and so forth to the extent there are additional low skew clock lines available. FIG. 5 illustrates this step being performed as a loop. Once every low skew clock line is programmed at step 520, or, alternatively, if a low skew clock line is not available, then the method proceeds to step 525.

At step 525, for each load on the original phase enable line (e.g., design signal $I_i$), a synchronous phase delay sequential element (i.e., the flip-flops discussed above) is programmed with the phase enable signal $P_{i-1}$ connected to the synchronous preset input pin S of the synchronous phase delay sequential element. It should be understood that the low skew clock line designated for the phase enable signal $P_{i-1}$ can be used in this instance because it is coupled to a sequential element rather than combinational logic, which is usually not permitted under the configuration settings of conventional FPGA circuits, as discussed above. Finally, at step 530, the combinational logic is programmed for the pin multiplexing circuitry. As described above, the combinational logic can include AND gates with an input coupled to the data output Q of each sequential element and a second input coupled to the user logic to receive a corresponding design signal. Furthermore, the data inputs D of the sequential logic are coupled to ground and the outputs of the AND gates are coupled to inverted inputs of a NAND gate, whose output is coupled to an output terminal as shown in FIG. 2.

It is noted that the exemplary embodiment utilizes a low skew clock line for each phase enable output that transmits a signal to a synchronous preset input S of a corresponding synchronous phase delay sequential element. Alternatively, it is noted that an equivalent circuit could be constructed by using a synchronous reset of the flip-flop and connecting the data input to supply signal instead of ground as shown in FIG. 2. In the event that there are more phase enable signals than available low skew clock lines, the low skew clock lines are utilized according to the priority discussed above. Moreover, when the number of phase enable signals exceeds the number of available low skew clock lines by a small number, the above algorithm can be utilized by repeated insertion of phase delay elements. In one further refinement of the exemplary embodiment, when the number of phase enable signals still exceeds the number of low skew clock lines, the EDA can duplicate the phase enable signals and place them closer to the logic requiring the signals to minimize the skew.

Accordingly, it should be appreciated that the above description and drawings are only to be considered illustrative of specific embodiments, which achieve the features and advantages described herein. Modifications and substitutions to specific process conditions can be made. Accordingly, the embodiments in this patent document are not considered as being limited by the foregoing description and drawings.

What is claimed is:

1. An apparatus for multiplexing signals of programmable logic devices in a prototyping system, the apparatus comprising:
   a reference clock programmed to generate a clock signal;
   at least one programmable logic device comprising:
      a plurality of input and output (I/O) terminals;
      combinational logic coupled to at least one of the plurality of I/O terminals;
      a phase generator programmed to receive the clock signal from the reference clock and to generate a phase clock based on the clock signal and a plurality of phase enable signals based on the phase clock; and
      at least one flip-flop programmed to have a clock input driven by the phase clock, a data input coupled to ground, and a data output coupled to the combinational logic;
      wherein a synchronous preset input of the at least one flip-flop receives one of the plurality of phase enable signals to control transmission by the at least one I/O terminal of at least one design signal received by the combinational logic.

2. The apparatus of claim 1, wherein the at least one programmable logic device is a field-programmable gate array.

3. The apparatus of claim 1, wherein the at least one programmable logic device further comprises programmable logic coupled to the combinational logic, the programmable logic corresponding to a partial logic design and generating the at least one design signal during an operation cycle of the prototyping system.

4. The apparatus of claim 3, wherein the combinational logic of the at least one programmable logic device comprises at least one AND gate having a first input coupled to the programmable logic to receive the at least one design signal and a second input coupled to the data output of the at least one flip-flop.

5. The apparatus of claim 4, wherein the combinational logic of the at least one programmable logic device further comprises at least one NAND gate having an inverted input coupled to an output of the AND gate and an output coupled to the at least one I/O terminal.

6. The apparatus of claim 1, wherein the phase generator further comprises a plurality of phase output pins and an internal counter that drives the plurality of phase enable signals on each of the plurality of phase output pins, respectively, based on the phase clock.

7. The apparatus of claim 1, wherein the at least one programmable logic device further comprises at least one low skew clock line that is programmed to couple at least one of the plurality of phase enable signals to the synchronous preset input of the at least one flip-flop.

8. A computer-implemented method for multiplexing signals of programmable logic devices in a prototyping system, the method comprising:
   programming a reference clock on a prototyping board of the prototyping system to generate a clock signal;
   programming combinational logic on at least one programmable logic device to be coupled to at least one of a plurality of I/O terminals of the at least one programmable logic device;
   programming a phase generator in at least one of the programmable logic devices to receive the clock signal from the reference clock;
   programming a phase generator in the at least one programmable logic device to generate a phase clock based on the clock signal and a plurality of phase enable signals based on the phase clock;
   connecting at least one flip-flop in the at least one programmable logic device to have a clock input driven by the phase clock, a data input coupled to ground, and a data output coupled to the combinational logic; and programming a synchronous preset input of the at least one flip-flop to receive one of the plurality of phase enable signals to control transmission by the at least one I/O terminal of at least one design signal received by the combinational logic.

9. The computer-implemented method according to claim 8, further comprising programming programmable logic of the at least one programmable logic device to correspond to a partial logic design and to generate the at least one design signal that is input to the combinational logic during an operation cycle of the prototyping system.

10. The computer-implemented method according to claim 9, further comprising programming the combinational logic of the at least one programmable logic device to include at least one AND gate having a first input coupled to the programmable logic to receive the at least one design signal and a second input coupled to the data output of the at least one flip-flop.

11. The computer-implemented method according to claim 10, further comprising programming the combinational logic of the at least one programmable logic device to further include at least one NAND gate having an inverted input coupled to an output of the AND gate and an output coupled to the at least one I/O terminal.

12. The computer-implemented method according to claim 8, further comprising programming the phase generator to include a plurality of phase output pins and an internal counter that drives the plurality of phase enable signals on each of the plurality of phase output pins, respectively, based on the phase clock.

13. The computer-implemented method according to claim 8, further comprising:
  sorting the plurality of phase enable signals generated by the at least one programmable logic device according to a number of loads driven by each of the plurality of phase enable signals;
  determining whether a low skew clock line of the at least one programmable logic device is available for the multiplexing; and
  if a low skew clock line is available, programming the available low skew clock line to be connected between the synchronous preset input of the at least one flip-flop and a previous phase of the plurality of phase enable signals.

14. A computer-readable non-transitory storage medium having stored thereon a plurality of instructions, the plurality of instructions when executed by a computer, cause the computer to:
  program a reference clock on a prototyping board of the prototyping system to generate a clock signal;
  program combinational logic on at least one programmable logic device to be coupled to at least one of a plurality of I/O terminals of the at least one programmable logic device;
  program a phase generator in at least one of the programmable logic devices to receive the clock signal from the reference clock;
  program a phase generator in the at least one programmable logic device to generate a phase clock based on the clock signal and a plurality of phase enable signals based on the phase clock;
  connect at least one flip-flop in the at least one programmable logic device to have a clock input driven by the phase clock, a data input coupled to ground, and a data output coupled to the combinational logic; and
  program a synchronous preset input of the at least one flip-flop to receive one of the plurality of phase enable signals to control transmission by the at least one I/O terminal of at least one design signal received by the combinational logic.

15. The computer-readable non-transitory storage medium according to claim 14, wherein the plurality of instructions when executed by a computer further cause the computer to program programmable logic of the at least one programmable logic device to correspond to a partial logic design and to generate the at least one design signal that is input to the combinational logic during an operation cycle of the prototyping system.

16. The computer-readable non-transitory storage medium according to claim 15, wherein the plurality of instructions when executed by a computer further cause the computer to program the combinational logic of the at least one programmable logic device to include at least one AND gate having a first input coupled to the programmable logic to receive the at least one design signal and a second input coupled to the data output of the at least one flip-flop.

17. The computer-readable non-transitory storage medium according to claim 16, wherein the plurality of instructions when executed by a computer further cause the computer to program the combinational logic of the at least one programmable logic device to further include at least one NAND gate having an inverted input coupled to an output of the AND gate and an output coupled to the at least one I/O terminal.

18. The computer-readable non-transitory storage medium according to claim 14, wherein the plurality of instructions when executed by a computer further cause the computer to program the phase generator to include a plurality of phase output pins and an internal counter that drives the plurality of phase enable signals on each of the plurality of phase output pins, respectively, based on the phase clock.

19. The computer-readable non-transitory storage medium according to claim 14, wherein the plurality of instructions when executed by a computer further cause the computer to:
  sort the plurality of phase enable signals generated by the at least one programmable logic device according to a number of loads driven by each of the plurality of phase enable signals;
  determine whether a low skew clock line of the at least one programmable logic device is available for the multiplexing; and
  if a low skew clock line is available, program the available low skew clock line to be connected between the synchronous preset input of the at least one flip-flop and a previous phase of the plurality of phase enable signals.

20. The computer-readable non-transitory storage medium according to claim 14, wherein each of the plurality of programmable logic devices is a field-programmable gate array.

* * * * *